United States Patent [19]
Best

[11] 3,979,988
[45] Sept. 14, 1976

[54] APPARATUS FOR CONVERTING A FLAT BLADE BAND SAW FOR USE WITH SPIRAL BLADES

[75] Inventor: Thomas Best, Los Angeles, Calif.

[73] Assignee: Tyler Manufacturing Co., Hawthorne, Calif.

[22] Filed: June 2, 1975

[21] Appl. No.: 582,760

[52] U.S. Cl. .................................. 83/820; 83/661
[51] Int. Cl.² .......................................... B27B 13/10
[58] Field of Search ............. 83/820, 661, 574, 523

[56] References Cited
UNITED STATES PATENTS

| | | |
|---|---|---|
| 3,196,910 | 7/1965 | Hawkins ........................... 83/820 X |
| 3,621,894 | 11/1971 | Niksich ............................. 83/820 X |

FOREIGN PATENTS OR APPLICATIONS

| | | |
|---|---|---|
| 886,843 | 10/1943 | France .................................. 83/661 |

*Primary Examiner*—J. M. Meister
*Attorney, Agent, or Firm*—Huebner & Worrel

[57] ABSTRACT

Apparatus for converting a flat blade band saw for use with spiral blades, the apparatus having upper and lower guide means for guiding a continuous spiral blade in a band saw, and having means for securing the guide means to the band saw structure. The guide means include spaced pairs of upper and lower rollers aligned to receive and to hold a spiral blade moving in a straight line between each pair of rollers.

11 Claims, 8 Drawing Figures

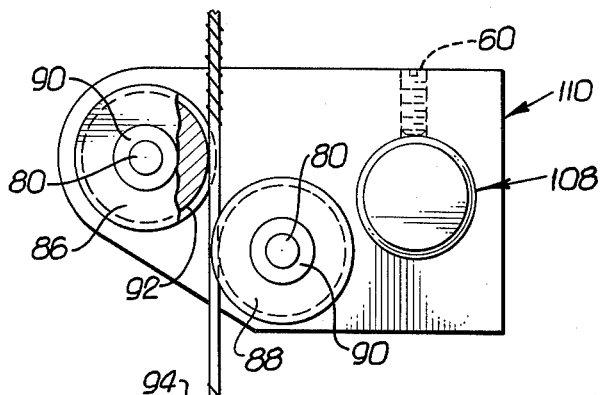
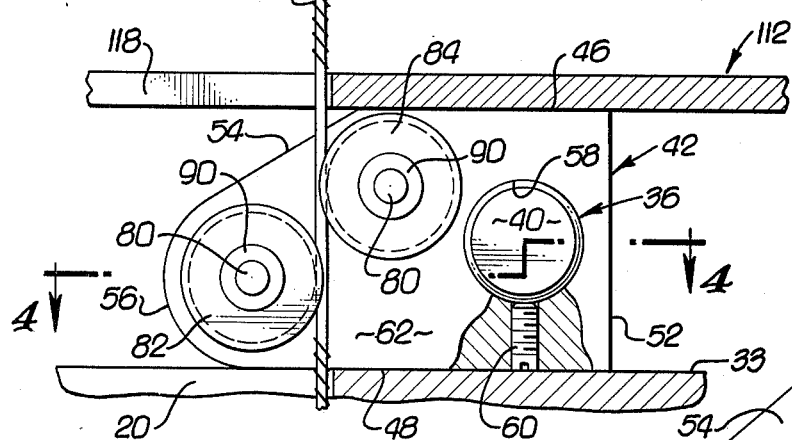
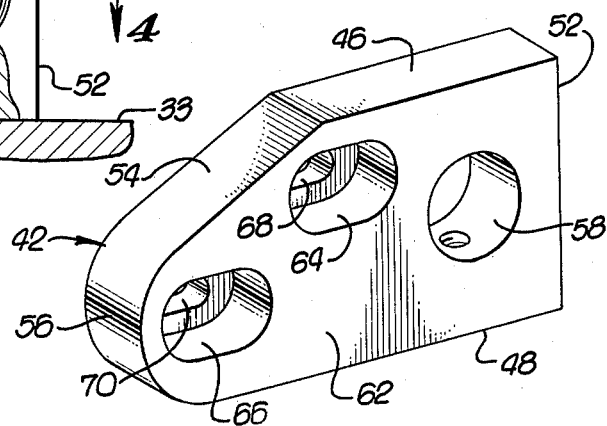
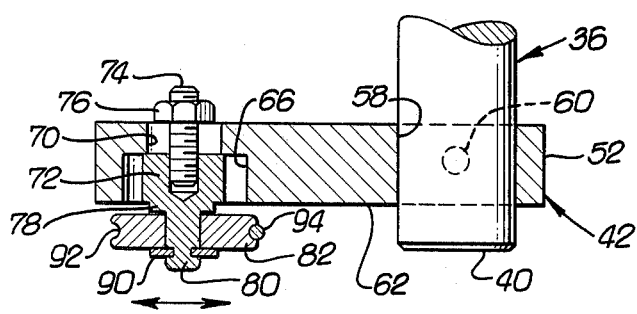

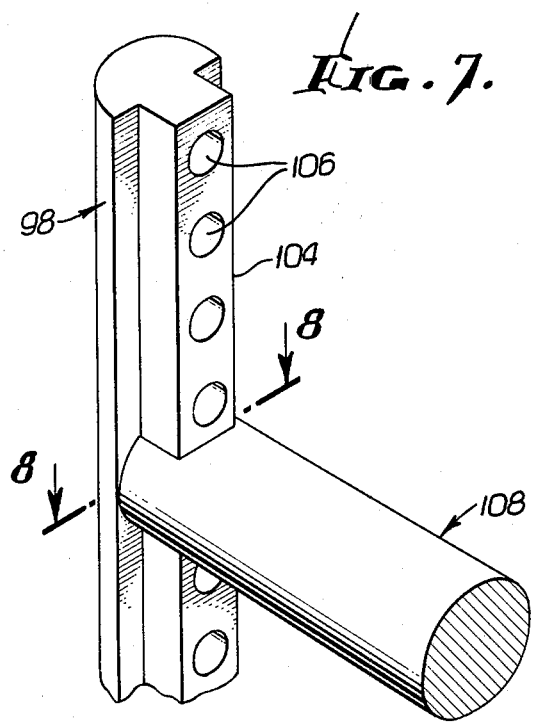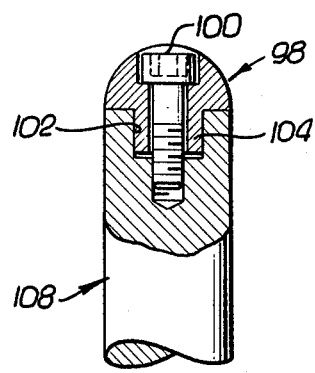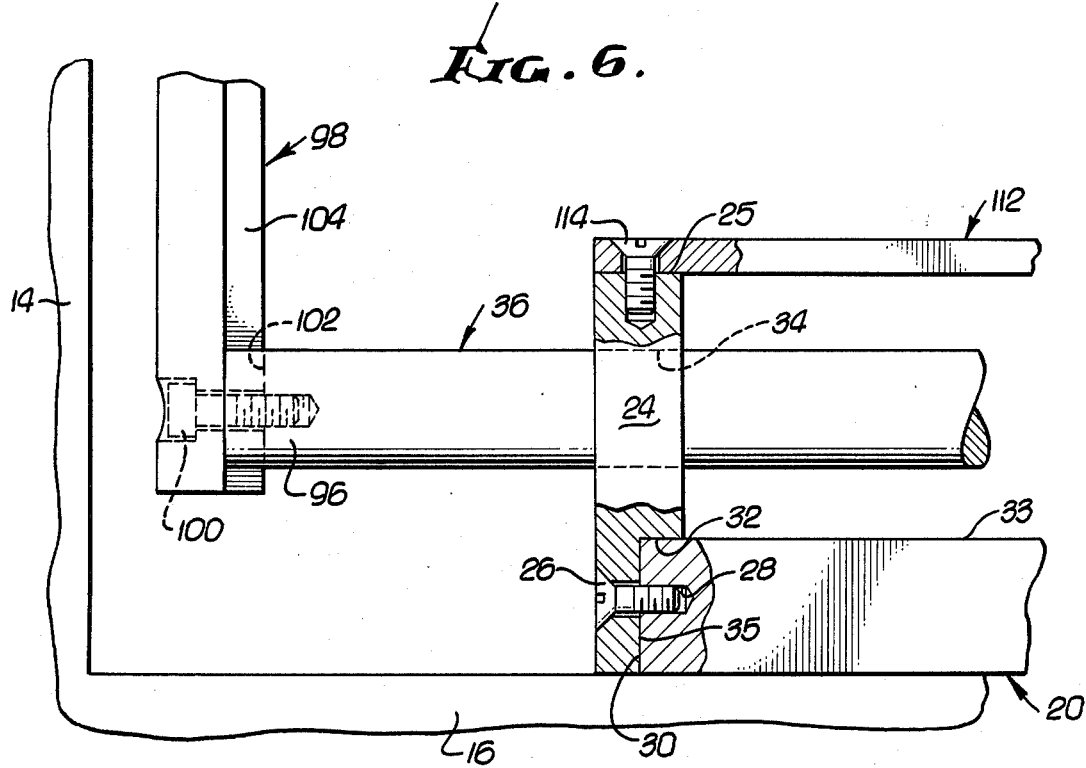

APPARATUS FOR CONVERTING A FLAT BLADE BAND SAW FOR USE WITH SPIRAL BLADES

BACKGROUND OF THE INVENTION

The invention relates to apparatus for converting a conventional band saw made to operate with a continuous flat blade so that the saw will operate using a continuous spiral blade. A spiral blade is considerably more flexible than a flat blade typically used in a band saw, and therefore there must be means in a band saw in which a spiral blade is to be used to support and guide the spiral blade adjacent the cutting area.

The present invention provides such guiding means for attachment to conventional band saws in the form of a very simple device. An easy conversion, as provided, is desirable in that a spiral blade is capable of cutting in any direction when embedded in a solid body. Flat blades perform satisfactorily within their limitations, but are characterized by their inability to perform certain desirable operations. The blade, being in the form of a thin strip, is able to advance through a cut in one direction but cannot turn abruptly at right angles to that direction while embedded in the body being sawed. The depth of a flat blade makes such a turn impossible, and to make an angle turn it is necessary to round a corner. Flat blades are also characterized by their variations in strength and are frequently broken by transverse or twisting force.

SUMMARY OF THE INVENTION

The present invention provides an apparatus by which spiral blades may be used in a conventional band saw of any size or type, and which may be installed without time-consuming modifications to the equipment.

Accordingly, it is an object of the present invention to provide apparatus for converting a band saw so that spiral blades can be used therein.

Another object of the invention is to provide apparatus for converting a band saw for use with spiral blades in which the installation is fast and easy, requiring only two bolts to mount the converter to the band saw table. Thus, the only modification required in the band saw structure is to drill and tap two bolt bores in an edge of the band saw table.

It is a further object of the invention to provide a converter, as described in the previous paragraphs, which can be adjustably fitted into any band saw, the adjustments or fitting being related to the height of the cutting area space and to the horizontal distance from the blade to the saw supporting the structure.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 3 is a view of the guiding means in the invention, taken along the lines 3—3 in FIG. 1;

FIG. 4 is a plan view taken substantially along the lines 4—4 in FIG. 3;

FIG. 5 is a perspective view of a block for mounting the roller guiding means according to the invention;

FIG. 6 is a fragmentary view taken along the lines 6—6 of FIG. 1;

FIG. 7 is a fragmentary view illustrating the connection between a vertical spacing rod and a horizontal rod for supporting upper guiding rollers; and FIG. 8 is a fragmentary cross-sectional view taken along the lines 8—8 of FIG. 7.

DESCRIPTION OF THE PREFERRED EMBODIMENT

Figure 1:
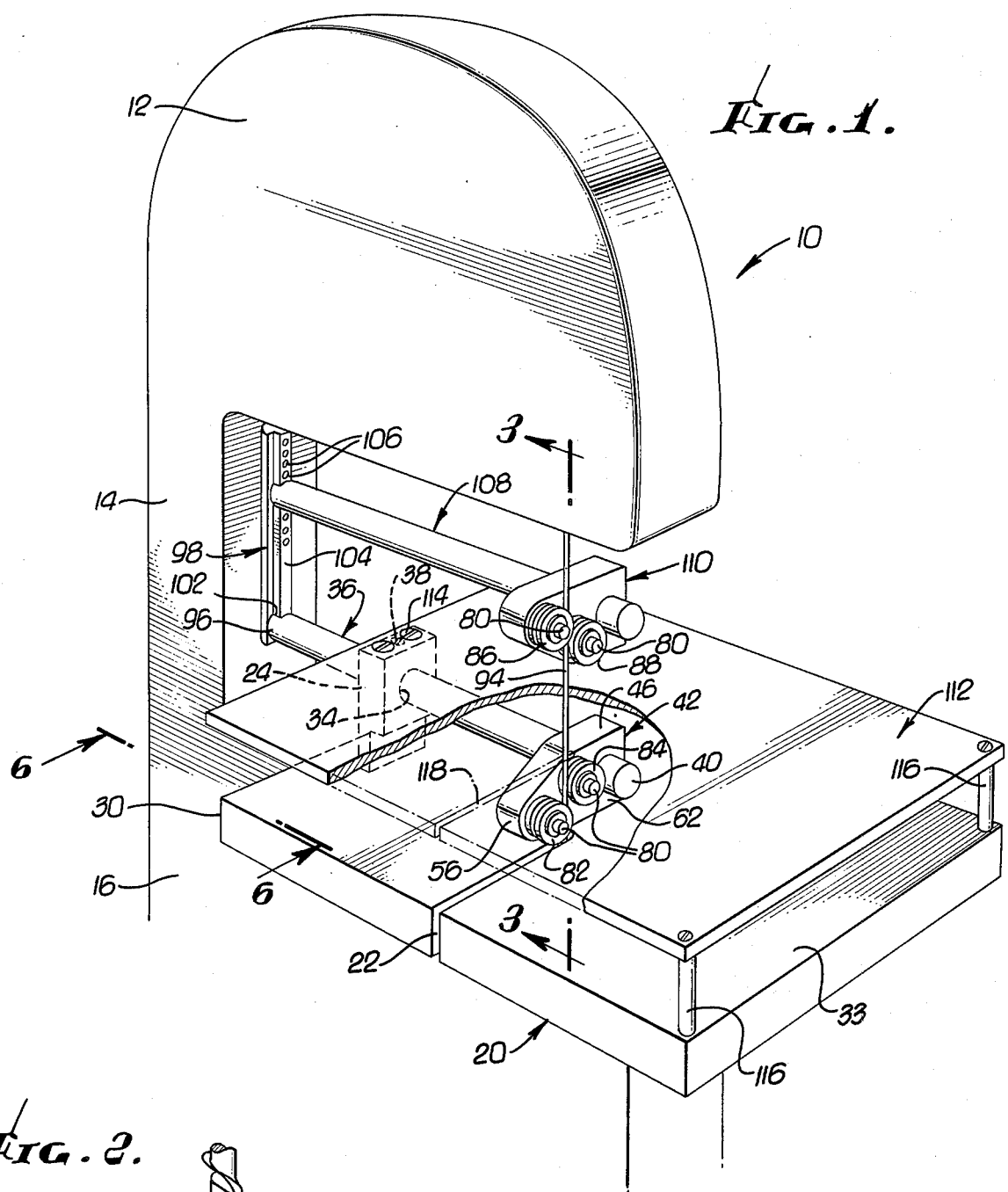
FIG. 1 is a fragmentary perspective view of a conventional band saw incorporating the converting apparatus according to the invention.
Figure 2:
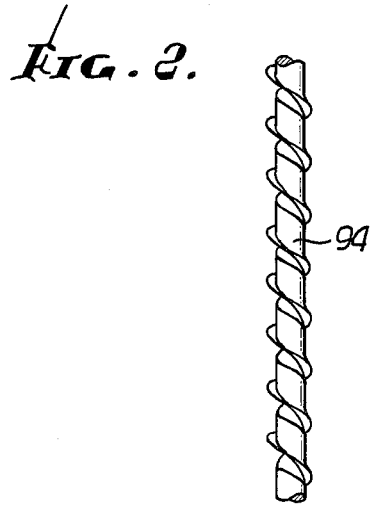
FIG. 2 is a fragmentary elevational view of a spiral blade.

Referring again to the drawings, there is shown in FIG. 1 the upper portion of a conventional band saw, generally designated as 10, having an upper cowling 12, a supporting enclosure 14, and a lower cowling area 16. Supported on the lower cowling 16 and structure therein is a conventional, rectangular band saw cutting table 20. Such cutting tables are usually made of a block of metal and have a slot 22 into which the band saw blade is moved when it is fitted onto the saw wheels.

Band saws are typically continuous and are fitted on upper and lower wheels, not shown, the lower wheel being driven by an electric motor to cause the band saw blade to move downwardly from the upper wheel through the slot 22 during the cutting operation. Conventional band saw wheels are covered with rubber to provide friction, and to protect the blade. Spiral blades run well on this rubber, forming a groove therein.

As shown in FIGS. 1 and 6, the converting apparatus is secured to a saw table 20 by means of two bolts 26 extending through a frame member 24 and engaged in tapped bores 28 in edge 30 of the table. The drilling and tapping of the bores 28 are the only modifications which have to be made to the band saw to install the converting apparatus. The member 24 has an upper horizontal surface 25 and at its lower end a rectangular prism has been cut away so as to permit a lower horizontal edge 32 to be supported on the table top 33 and rear vertical surface 35 to be secured on the table edge 30. A hole 34 extends through the block 24 to receive a horizontally positioned lower supporting rod 36 which is adjustably secured therein by means of a set screw 38.

As shown in FIGS. 1 and 3–5, secured on the rod 36, adjacent its end 40, in the cutting area, is a lower mounting block 42. The block 42 is generally rectangular, having an upper flat surface 46 and a lower flat surface 48 which is supported on the top 33 of the table 20. One end of the block has a flat, vertical surface 52 and the other end has an inclined surface 54 terminating in a curved surface 56. Extending through the block is a hole 58 in which the rod 36 is adjustably secured by means of a set screw 60.

A face 62 of the block adjacent the cutting area has two countersunk slotted bores 64 and 66 which terminate on the shoulders surrounding slotted openings 68 and 70. Roller axle support members 72 are adjustably fitted within the countersunk vertically and horizontally spaced bores 64 and 66. The members 72 have upper and lower parallel surfaces which engage the upper and lower parallel surfaces of the countersunk bores. The members 72 are shorter in length than the countersunk bores to permit horizontal adjusting movement therein. Extending through the slotted openings 68 and 70 are bolts 74 which secure the members 72 in the countersunk bores. The bolts are movable horizontally in the openings 68 and 70 for adjusting the position of the members 72 and are tightened by means of nuts 76. Outwardly of the members 72 are a reduced diameter spacing head 78 and from which extends axles 80 on which lower guide rollers 82 and 84 are bearing mounted for rotation. An identical pair of upper rollers 86 and 88 are mounted in the same manner on an upper mounting block 110, as shown in FIG. 3. The rollers are secured on the vertically and horizontally spaced axles 80 by means of spring clips 90. Each of the rollers has a circumferential, substantially semicircular groove 92, the groove being adapted to guide and control a continuous spiral saw blade 94 of the type described in U.S. Pat. No. 2,514,609. The grooves 92, having substantially the same diameter as the blade, are transversely aligned to receive the latter, the rollers being in a spaced but overlapping relationship.

As shown in FIGS. 1 and 6–8, at the other end 96 of the lower supporting rod 36 is a vertical spacing rod 98 secured to the rod 36 by means of an Allen bolt 100. The rod end 96 has a channel-shaped cutaway portion 102 which fits over an elongated protrusion 104 on the spacing rod. The upper part of the spacing rod has a plurality of openings 106 extending therethrough to provide for adjustably fitting one end of horizontal upper supporting rod 108, identical to lower rod 36. The adjustment provided by the rod 98 is relative to the space between the lower end of the upper cowling 12 and the table 20 and the positioning of the guiding rollers. The rod 108 is secured to the spacing rod by means of an Allen bolt 100.

At the other end of the rod 108 is an upper roller mounting block 110 of the same type as mounting block 42 but in allochiral relationship therewith. The upper rollers 86 and 88 are adjustably positioned in the same manner as the lower rollers and are arranged vertically and horizontally to permit the blade 94 to move downwardly in a straight line in the grooves 92. This arrangement of the rollers prevents the blade, which is considerably more flexible than a band blade, from moving out of the proper cutting position, and act as guides to insure its remaining in the proper cutting position.

The upper surface 25 of the member 24 is on the same horizontal level as the upper surface 46 of the lower mounting block. Cutting may be accomplished by supporting and moving the workpiece on the surface 46, as well as on the surface 25, so as to hold it in the proper horizontal position. If it is desired, a cutting table 112 may be provided which is supported on the surfaces 25 and 46 and secured in position to the member 24 by means of screws 114. As its outer end the table is also supported by legs 116 which extend upwardly from the lower table surface 33. The table 112 has a slot 118 in vertical alignment with the slot 22 to permit the blade 94 to be put on the saw structure and to travel in the cutting position.

By means of the alignment arrangement of the guiding rollers 82, 84, 86 and 88 the blade 94 is caused to move vertically in a constant straight line cutting position.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:

1. In a flat blade band saw, apparatus for converting the band saw for use with spiral blades, comprising:

vertically spaced upper and lower guide means for guiding a continuous spiral blade adjacent the table and cutting area in a band saw structure, and mounting means for securing said guide means to the band saw structure, said upper and lower guide means each being comprised of a pair of respective upper and lower spaced rollers mounted for rotation on said mounting means, each of said rollers having a circumferential groove for receiving said spiral blade, said mounting means including a frame member being adapted to be secured to and above the band saw table to secure said mounting means thereto, a lower supporting member supported by said frame member, a lower roller mounting block secured adjacent one end of said lower supporting member, said lower pair of rollers being secured to said lower block, a spacing member secured adjacent the other end of said supporting member and extending upwardly therefrom, an upper supporting member extending horizontally from said spacing member above said lower supporting member, and an upper roller mounting block secured adjacent one end of said upper supporting member, said upper pair of rollers being secured to said upper block above said lower pair of rollers, said pairs of rollers being aligned to receive said spiral blade moving in a straight line between each pair of rollers in said grooves.

2. The invention according to claim 1 in which:

said frame member and said lower mounting block have upper horizontal, aligned surfaces adapted to support a workpiece for cutting by said spiral blade.

3. The invention according to claim 1 in which:

said frame member and said lower mounting block have upper horizontally aligned surfaces, a work table secured to said frame member and supported on said aligned surfaces to support a workpiece for cutting by said spiral blade, said table having legs adapted to be supported on said band saw table.

4. The invention according to claim 1 in which:

said pairs of rollers are adjustably alignable in said respective upper and lower blocks to be moved horizontally into vertical alignment so as to align said grooves to receive said spiral blade.

5. The invention according to claim 1 in which:

said upper supporting member is vertically adjustable on said spacing member.

6. In a flat blade band saw, apparatus for converting the band saw for use with spiral blades, comprising:

vertically spaced upper and lower guide means for guiding a continuous spiral blade adjacent the cutting area in a band saw structure, mounting means for securing said guide means to the band saw structure, said mounting means including a frame member adapted to be secured to and above the band saw table to secure said mounting means thereto, a lower supporting member supported by said frame member, a lower guide means mounting block secured adjacent one end of said lower supporting member, said lower guide means being secured to said lower block, a spacing member secured adjacent the other end of said lower supporting member and extending upwardly therefrom, an upper supporting member extending horizontally from said spacing member above said lower supporting member, and an upper guide means mounting block secured adjacent one end of said upper supporting member, said upper guide means being secured to said upper block above said lower guide means, said upper and lower guide means being aligned to receive said spiral blade moving in a straight line between each guide means.

7. The invention according to claim 6 in which:

said frame member and said lower mounting block have upper horizontal, aligned surfaces adapted to support a workpiece for cutting by said spiral blade.

8. The invention according to claim 6 in which:

said frame member and said lower mounting block have upper horizontally aligned surfaces, a work table secured to said frame member and supported on said aligned surfaces to support a workpiece for cutting by said spiral blade, said table having legs adapted to be supported on said band saw table.

9. The invention according to claim 6 in which:

said upper supporting member is vertically adjustable on said spacing member.

10. The invention according to claim 8 in which:

said upper and lower guide means are each comprised of a pair of respective upper and lower spaced rollers mounted for rotation on said respective upper and lower mounting blocks, each of said rollers having a circumferential groove for receiving said spiral blade, the axes of said rollers in each pair are spaced vertically and horizontally from each other, the grooves in said upper pair of rollers being aligned to receive said spiral blade therein for movement between the rollers, the grooves in said lower pair of rollers being aligned to receive said spiral blade therein for movement between the rollers, and the grooves of said upper and lower pairs of rollers being aligned to receive said spiral blade moving in a straight line.

11. The invention according to claim 10 in which:

said rollers are adjustably mounted for aligning said grooves.

* * * * *